(12) United States Patent
Romero

(10) Patent No.: US 6,170,540 B1
(45) Date of Patent: Jan. 9, 2001

(54) HIGH SPEED DEPOSITOR WITH POSITIVE DISPLACEMENT PUMP AND STEPPING MOTOR

(76) Inventor: Stephen Gilbert Romero, 1949 Penny Royal Ave., Richland, WA (US) 99352

( * ) Notice: Under 35 U.S.C. 154(b), the term of this patent shall be extended for 0 days.

(21) Appl. No.: 09/289,908

(22) Filed: Apr. 13, 1999

Related U.S. Application Data

(60) Provisional application No. 60/081,756, filed on Apr. 14, 1998.

(51) Int. Cl.$^7$ .................................................. B65B 3/00
(52) U.S. Cl. .......................... 141/83; 141/94; 141/192; 141/243; 141/244
(58) Field of Search .............................. 141/83, 94, 95, 141/192, 234, 236, 237, 242–245

(56) References Cited

U.S. PATENT DOCUMENTS

| | | | |
|---|---|---|---|
| 3,357,606 | * 12/1967 | Kahlenberg | 141/236 |
| 3,698,450 | * 10/1972 | Taylor et al. | 141/242 |
| 4,401,141 | * 8/1983 | Rosen et al. | 141/192 |
| 5,148,841 | * 9/1992 | Graffin | 141/83 |
| 5,996,650 | * 12/1999 | Phallen et al. | 141/83 |

* cited by examiner

Primary Examiner—J. Casimer Jacyna
(74) Attorney, Agent, or Firm—David S. Thompson

(57) ABSTRACT

The high speed depositor allows the manufacturing plant, e.g., a modern large bakery, to double the production of the batter, filling and icing lines. The depositor is comprised of a food quality positive displacement pump, a high torque stepping motor, a microprocessor based controller and a depositing manifold with individual valves. Other supporting apparatus, which are inputs and outputs of the controller, include a rotary encoder to measure the degrees of revolution of the pump, an air solenoid valve to apply air (motive force) to the stepping motor and an on/off switch to start and stop the depositing operation. Each nozzle on the depositing manifold has a flow control device to equalize the flow and therefore each cup weight of product deposited into the baking pan. A feed tank or hopper supplies a constant flow of product to the suction of the depositor pump. The manifold is typically mounted a few inches above a conveyor which carries baking pans underneath the manifold nozzles. The columns of baking pan cups pass directly underneath the nozzles and the product configuration downloaded to the depositor controller causes it to make accurate deposits into each cup in each row. The stepping motor causes the pump to turn the exact degrees of revolution necessary to deliver the desired cup weight into each of the baking pan cups.

6 Claims, 6 Drawing Sheets

HIGH SPEED DEPOSITOR WITH POSITIVE DISPLACEMENT PUMP AND STEPPING MOTOR

BACKGROUND—CROSS-REFERENCES TO RELATED APPLICATIONS

This application claims the benefit of Provisional Patent Application Ser. No. 60/081,756, filed Apr. 14, 1998 titled High Speed Depositor with Positive Displacement Pump and Stepping Motor (hereafter referred to simply as the high speed depositor).

BACKGROUND

1. Field of the Invention

This invention relates to a high speed depositor which raises the number of deposits from 60 per minute maximum for conventional batter and filling depositors to 120 per minute minimum. This will eliminate the filling or depositing line from being considered the production bottleneck in a large bakery. This same depositor configuration can also be used for depositing other types of products including cosmetics, pharmaceuticals, other food products or any other product which requires precision deposits of liquid in each container or package.

BACKGROUND

2. Description of Prior Art

Currently, depositing of batter or filling into cake, muffin or pie pans is primarily done with piston depositors at a maximum rate of 60 deposits per minute. Piston depositors are popular since they are the most accurate when it comes to matching the cup weight for the product. Cup weight is the weight of the batter or filling in the individual muffin cup, cake pan or pie pan before it is baked. If the cup weight is higher than it has to be, then the food company is giving away product, and if it is lower than it should be, then the food company can be accused of false advertising.

The pump in U.S. Pat No. 4,262,709 to Mayfield, Apr. 21, 1981 is the piston type and so the piston capacity determines the exact cup weight deposited.

In U.S. Pat. No. 5,244,370 to DeMars, Sep. 14, 1993 a pressure system is used in the place of a pump to push the hash brown material through the depositor delivery assembly. Changing the speed of rotation of the rotary valve components and/or size of the wiper blades controls the lengths of hash brown potato strands produced by the depositing apparatus.

In U.S. Pat. No. 3,708,255 to Schertz et al, Jan. 2, 1973 cut-off valves reciprocate past the depositor delivery assembly openings to cut off the dough instead of stopping the pump. It is the size of the ring forming opening and the timing of the cutoff valves which determines the individual or cup weights of the donuts.

A metering pump in U.S. Pat. No. 4,850,833 to Pinto et al, Jul. 25, 1989 delivers precise amounts of icing to individual passageways formed in the stationary member, so that precisely metered amounts of icing are extruded through the extrusion orifices, the icing then being cut off by the stationary member located at the bottom portion of the rotary shell.

Objects and Advantages

One of the objects and advantages of the invention, the high speed depositor, is in the deposit delivery method. The degrees of turning of the positive displacement pump shaft, as controlled by the stepping motor and the depositor controller, are used to dispense the exact cup weight required. The high torque stepping motor starts and stops for each deposit. The cup weight delivered to the pan or pan cups is determined by how many degrees the pump shaft is turned by the stepping motor. The degrees of pump shaft turning is measured by a rotary encoder apparatus attached to the pump shaft. The microprocessor based controller takes the encoder input and based on its program setup for a particular product, including the pan size and the pump capacity, the controller advances the stepping motor the exact number of revolutions and/or partial revolutions to deliver the exact cup weight desired. This results in fewer moving parts than used in the prior art referenced above.

Another problem solved is providing a quick changeover period when going from one product to the next. Instead of having to replace the entire depositor as would using any of the prior art discussed, the operator merely has to download the correct product configuration to the microprocessor based controller and quickly disconnect the manifold used for the previous product pan layout and connect the correct manifold for that product pan layout. Product pans come in many different sizes and shapes and have different numbers and sizes of cups to hold the deposited product. The depositor dispensing apparatus may consist of a single spigot or nozzle for a cake or pie deposit or a manifold with separately orifice controlled nozzles for simultaneous muffin deposits in a single row of the baking pan.

Another problem solved is providing a means to automatically deposit the same cup weight in each cup of the pan. Whereas the prior art utilizes individual pistons or chambers of equal size to guarantee equal cup deposits, the invention utilizes individual sizing of the nozzle orifices. The individual cup weights in a simultaneous multiple deposit can be determined empirically and maintained as equal by inserting the correct size orifice plates in each nozzle of the depositor manifold. Cup weight can also be automatically controlled by using individual flow measurement and a control valve to vary the orifice on each nozzle to achieve equal nozzle flow and hence equal weight.

DRAWING FIGURES

REFERENCE NUMERALS IN DRAWINGS

| 10 | positive displacement pump | 12 | high torque stepping motor |
| 14 | depositing manifold | 16 | individual nozzle valve |
| 18 | product hopper | 20 | microprocessor based controller |
| 22 | on/off switch | 24 | air solenoid valve |
| 26 | encoder proximity sensor | 28 | encoder disk |
| 30 | air pressure regulator | 32 | pre-regulator air filter |
| 34 | post-regulator air oiler | 36 | depositor mounting cart |
| 38 | motor shaft to pump shaft coupling | 40 | test spillage return trough |
| 42 | air shutoff valve | | |

SUMMARY

In accordance with the present invention a high speed depositor consists of positive displacement pump whose motive force is a high torque stepping motor. The stepping motor stops and starts the pump at precise intervals in accordance with the desired product weight to be deposited. The pump forces the product through piping to a single nozzle or a manifold with a plurality of nozzles to match the number of cups in a baking or icing pan row. A pan-in-place sensor provides an input to the microprocessor based controller to notify it that a pan depositing cycle has begun. A conveyor running at a known speed passes the pan underneath the manifold nozzle. A product configuration has been downloaded to the controller. The product configuration includes the volume amount of product to deposit equalling the cup weight, the conveyor speed, and the pan configuration including cup size, distances between cup rows and the number of cup rows. The controller program uses the product configuration to calculate when to start and stop the high torque stepping motor by opening and closing the air solenoid valve providing the motive force to turn the stepping motor. A rotary encoder apparatus provides an input to the controller which is used to determine how many degrees of rotation to turn the positive displacement pump in order to deliver the precise amount of cup weight of product into each cup of each pan row.

Detailed Description—FIGS. 1 to 8

Figure 1:
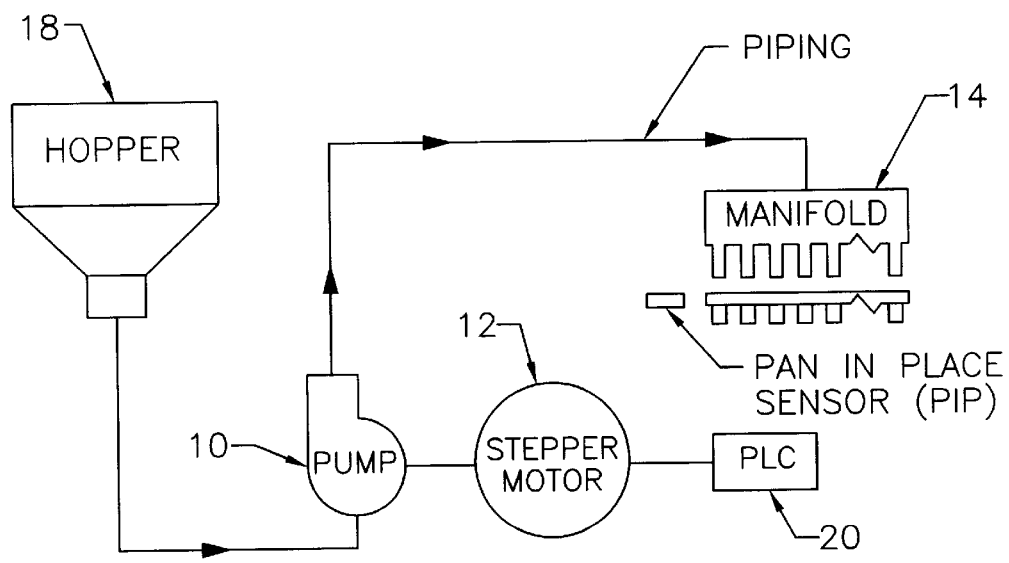
FIG. 1 shows a flow diagram of a high speed depositor which utilizes a positive displacement pump driven by a stepping motor.

FIG. 1 shows a flow diagram of a high speed depositor which utilizes a positive displacement pump 10 driven by a stepping motor 12 controlled by a microprocessor based controller or programmable logic controller (PLC) 20 capable of precise control of the pump's rotation thereby depositing accurate amounts of product with great reliability and repeatability. The positive displacement pump 10 forces the product through piping and into the depositor delivery manifold 14 and into the pan or receptacle(s) passing underneath the manifold nozzles. The piping, pan and pan-in-place sensor are not an integral part of the current embodiment of this invention.

Figure 2:
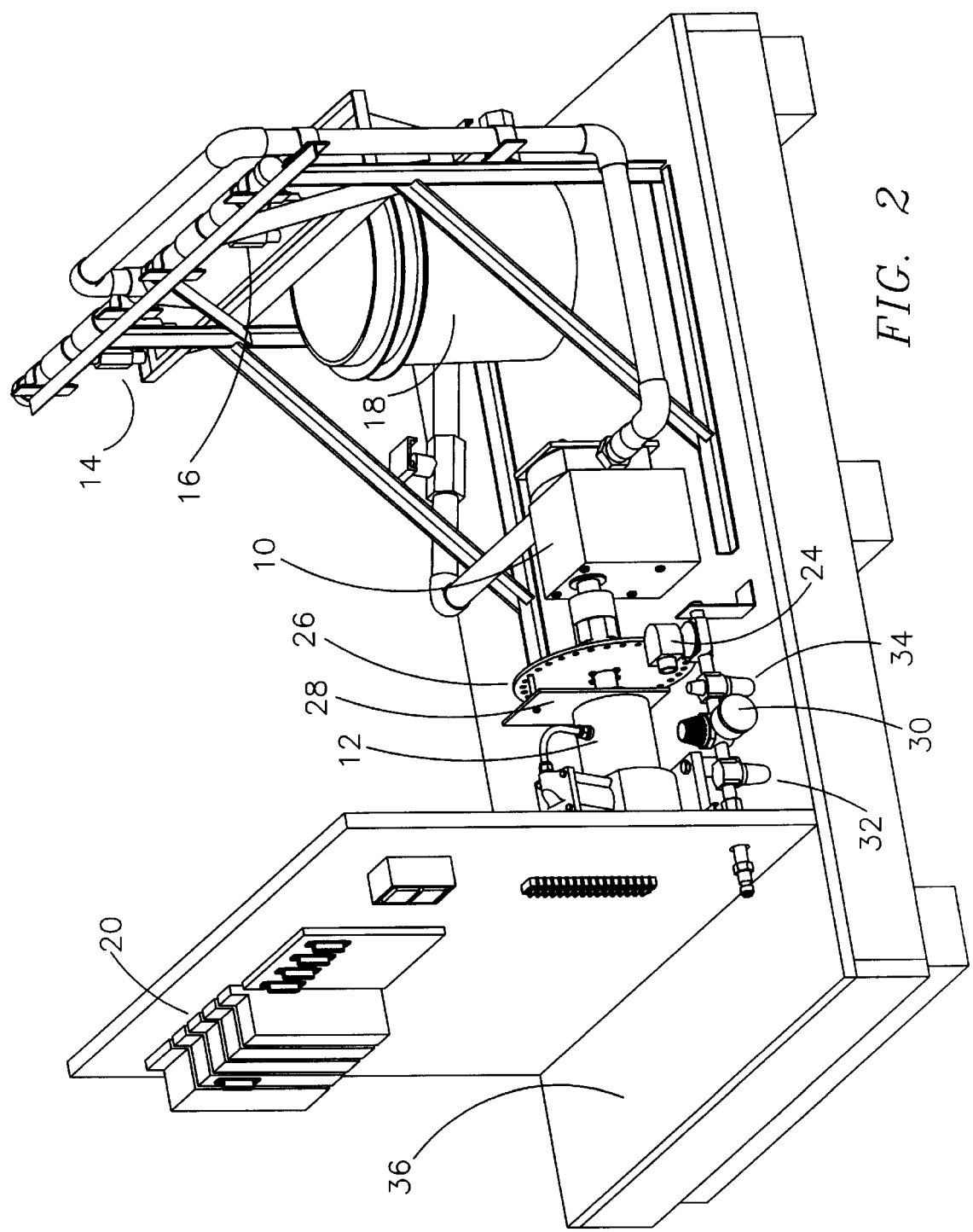
FIG. 2 shows a pictorial diagram of a high speed depositor set up for testing.

FIG. 2 shows the subject of this patent application, an improved batter, filling or icing depositor. The high speed depositor is an assembly of several parts: a positive displacement pump 10, a high torque stepping motor 12 to drive the pump, a manifold 14 with valved nozzles for equal distribution of equal deposits into individual pan cups, a microprocessor based controller 20 to automatically control the turning of the stepping motor 12 which turns the pump shaft and hence the amount of each deposit, a feed tank or hopper 18 to hold the batter or filling, and a depositor mounting cart with frame 36 to provide mounting of the individual parts resulting in a complete depositor assembly. An on/off switch 22 is used to activate the depositor controller program. Each nozzle is equipped with a valve 16 to control the nozzle orifice size. A solenoid valve 24 is used to switch the air pressure on and off to the stepping motor 12 whose motive force in this current embodiment of the present invention is air pressure. A rotary encoder apparatus consisting of a proximity sensor 26 and metal disk 28 is used by the controller 20 to know when to start and stop the stepping motor 12 for each deposit. A pressure regulator 30 adjusts the air supply pressure to the correct operating pressure for the stepping motor 12. A pre-regulator filter 32 is used to clean the air going to the stepping motor 12 via the pressure regulator 30 and solenoid valve 24. A post-regulator air oiler 34 is used to provide a light oil aerosol to internally lubricate the stepping motor 12. The depositor mounting cart 36 provides the mounting framework and support hardware for the depositor assembly.

Figure 3:
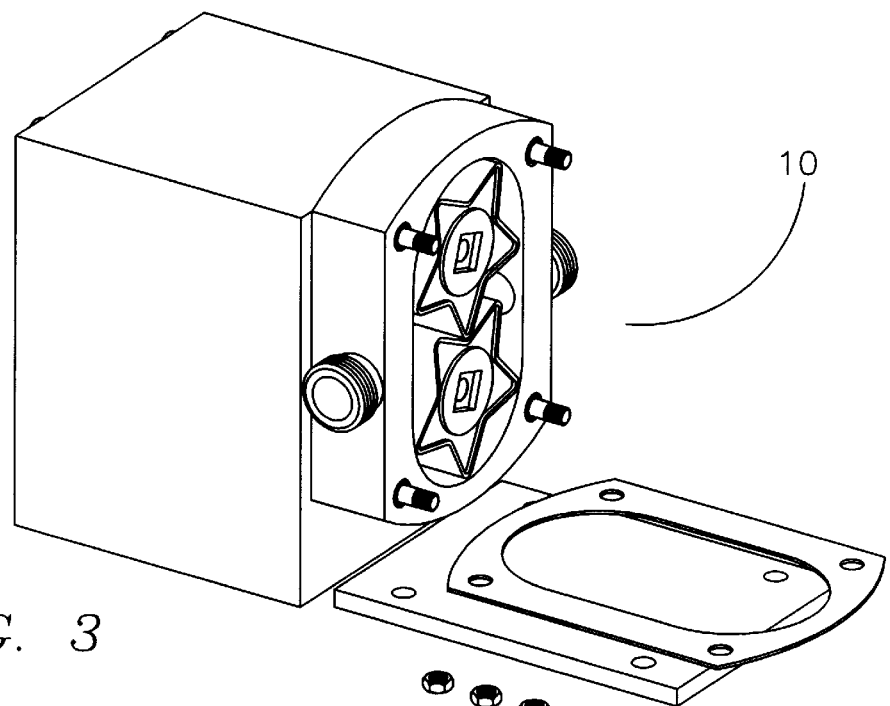
FIG. 3 shows the internal product pushing gears of the positive displacement pump.

FIG. 3 shows a pictorial representation of the positive displacement pump 10 used in the current embodiment of this invention with the positive displacement gears exposed.

Figure 4:
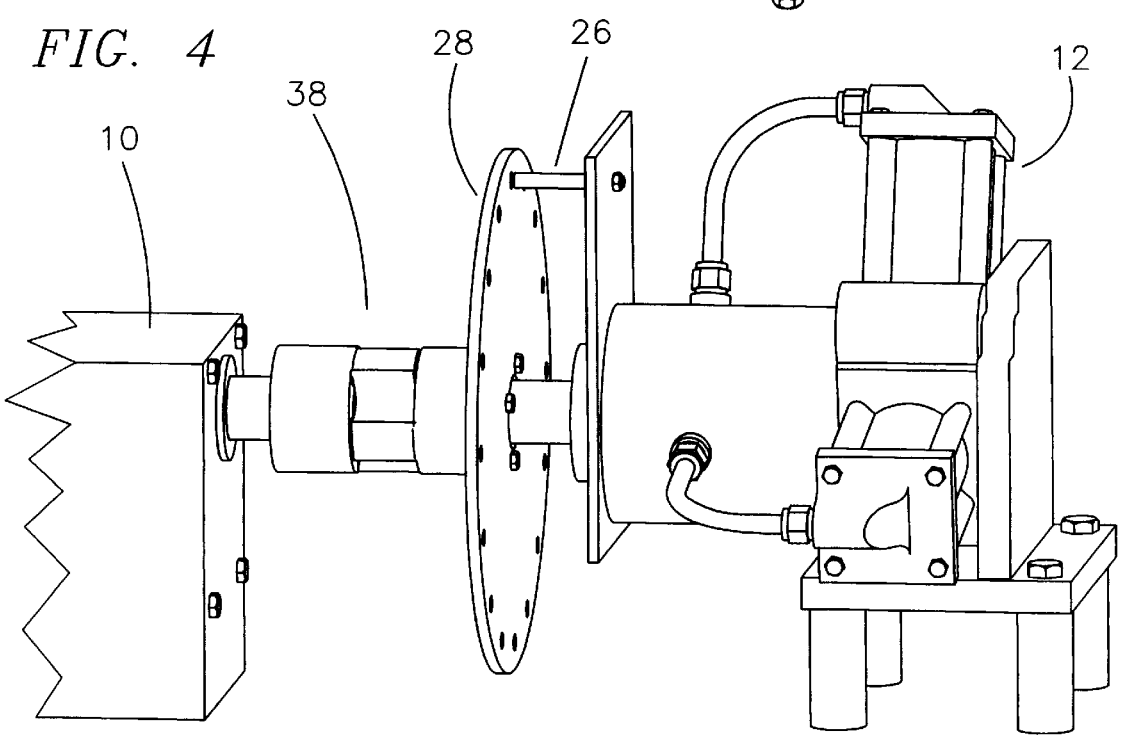
FIG. 4 shows the high torque stepping motor.

FIG. 4 depicts a pictorial representation of the positive displacement pump 10, with its shaft connected via a coupling 38 to the shaft of the stepping motor 12 used in the current embodiment of this invention. The rotary encoder apparatus is comprised of the proximity sensor 26 which senses holes in the perimeter of the metal disk 28 which is mounted to and turns with the stepping motor 12 shaft. In the current embodiment of this invention, the metal disk 28 has 24 holes drilled into its perimeter. Therefore, there are 24 pulses sent to the controller 20 (FIG. 2) by the proximity sensor 26 each time the motor 12 completes one revolution.

Figure 5:
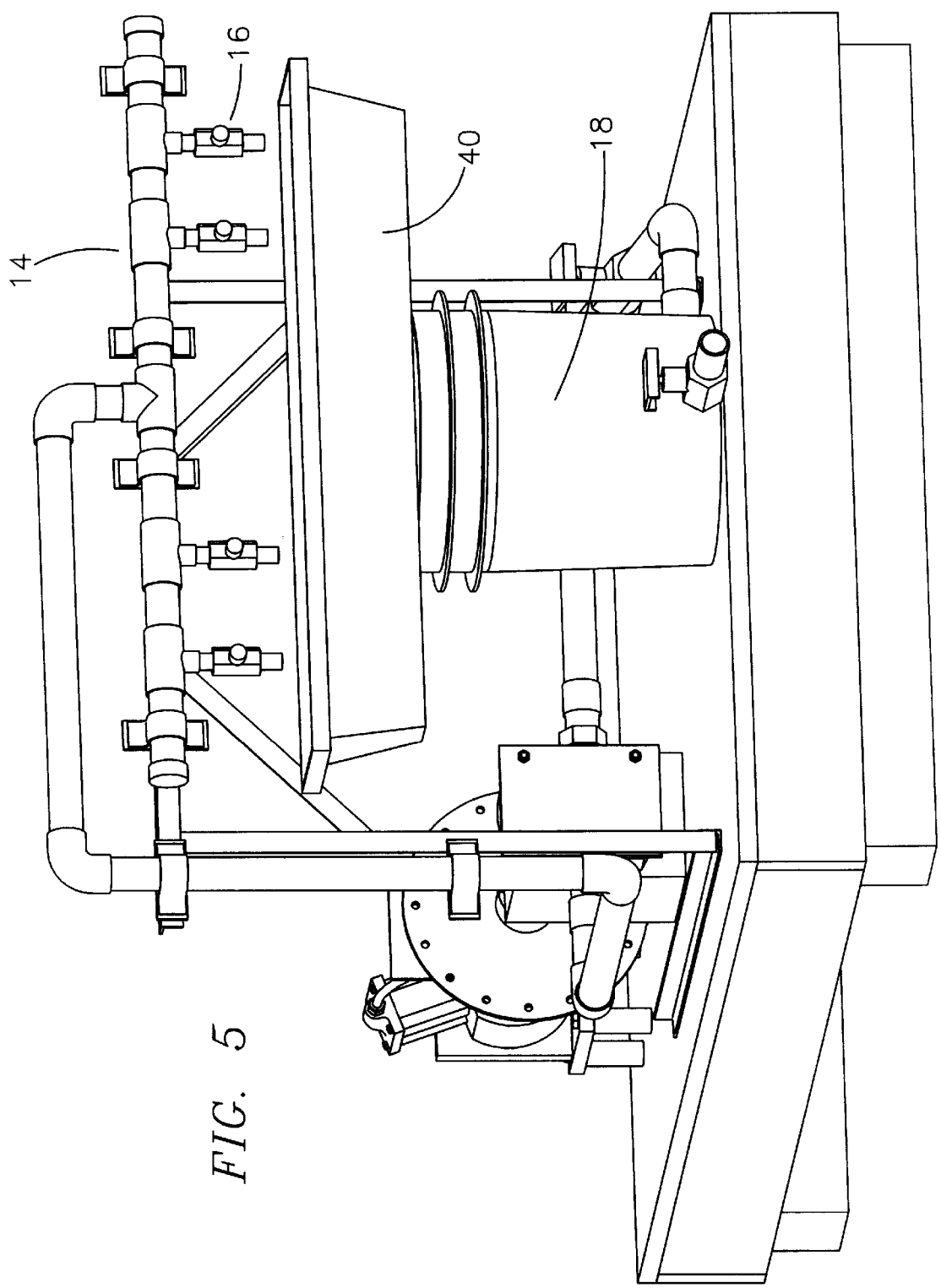
FIG. 5 shows the manifold in the cup weight test setup.

FIG. 5 is a pictorial representation of the manifold 14 and the individual depositing nozzle valves 16. In the current embodiment of the invention, the depositor is setup to test the accuracy of the individual deposits or cup weights. Any spillage is returned via the trough 40 to the hopper 18.

Figure 6:
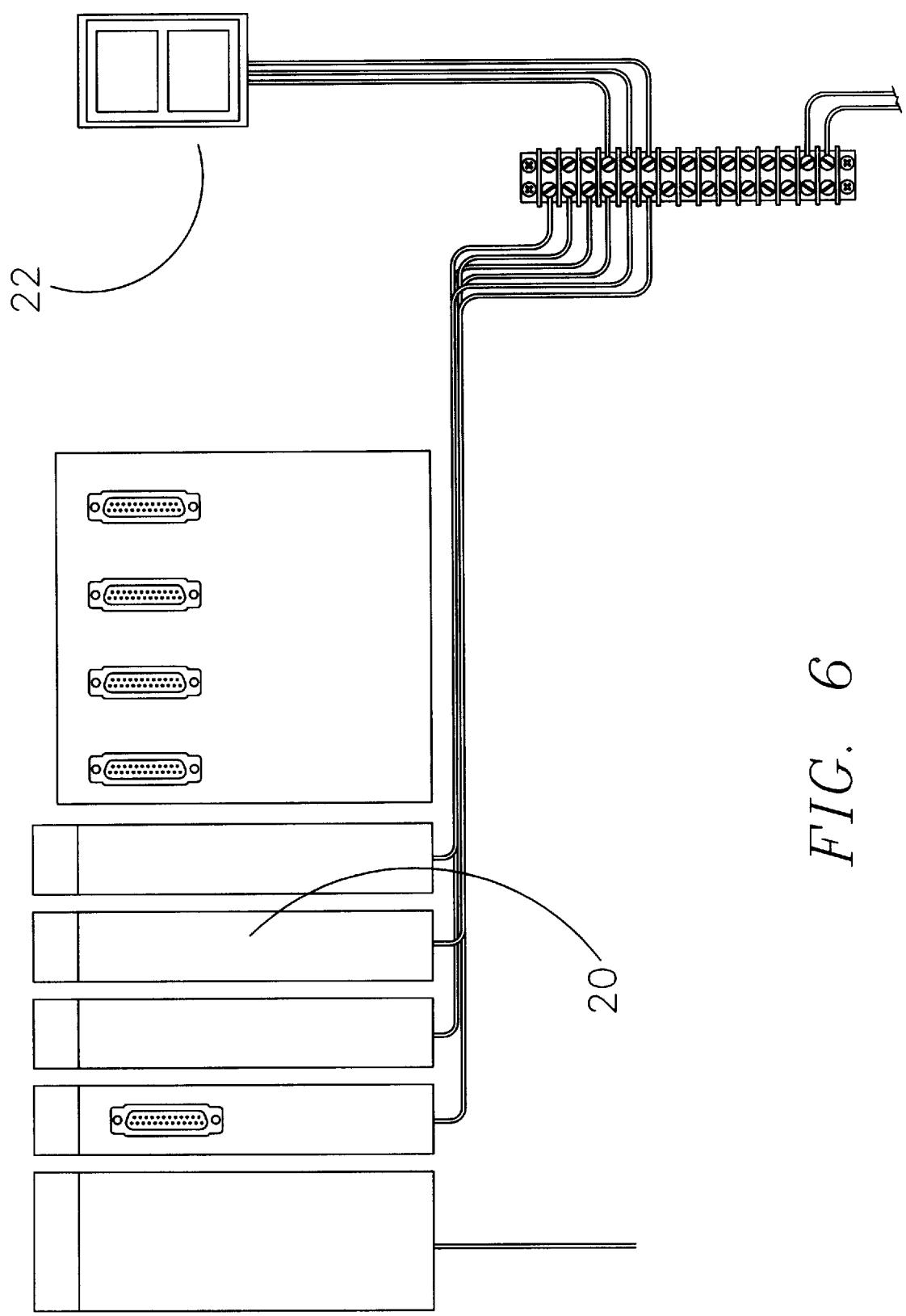
FIG. 6 shows the programmable logic controller which is a microprocessor based controller.

FIG. 6 is a front view of the controller 20 and the on/off switch 22.

Figure 7:
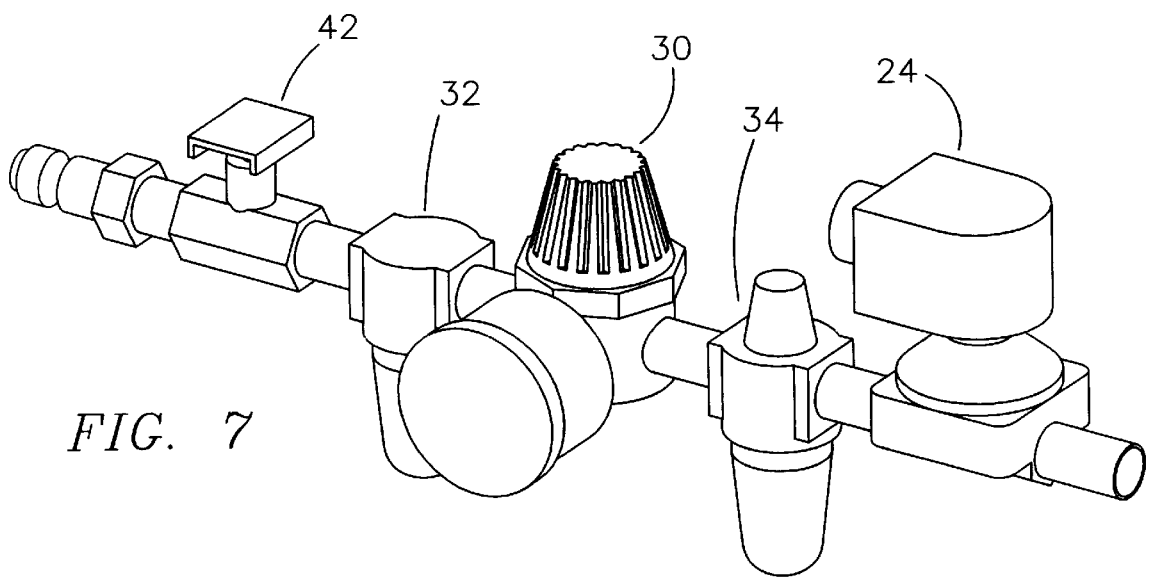
FIG. 7 shows the air solenoid valve, pressure regulator and filters used to control the high torque stepping motor.

FIG. 7 is a detail of the air delivery apparatus showing the air shut off valve 42 connected to the air filter 32 connected to the air pressure regulator 30 connected to the air oiler 34 connected to the air solenoid valve 24. With this setup, filtered, pressure regulated and oiled air is fed to the stepping motor 12 (FIG. 2) in controlled bursts by the air solenoid valve 24 which is energized for the time necessary to turn the pump 10 (FIG. 2) the programmed number of revolutions to ensure the correct cup weight is deposited.

Figure 8:
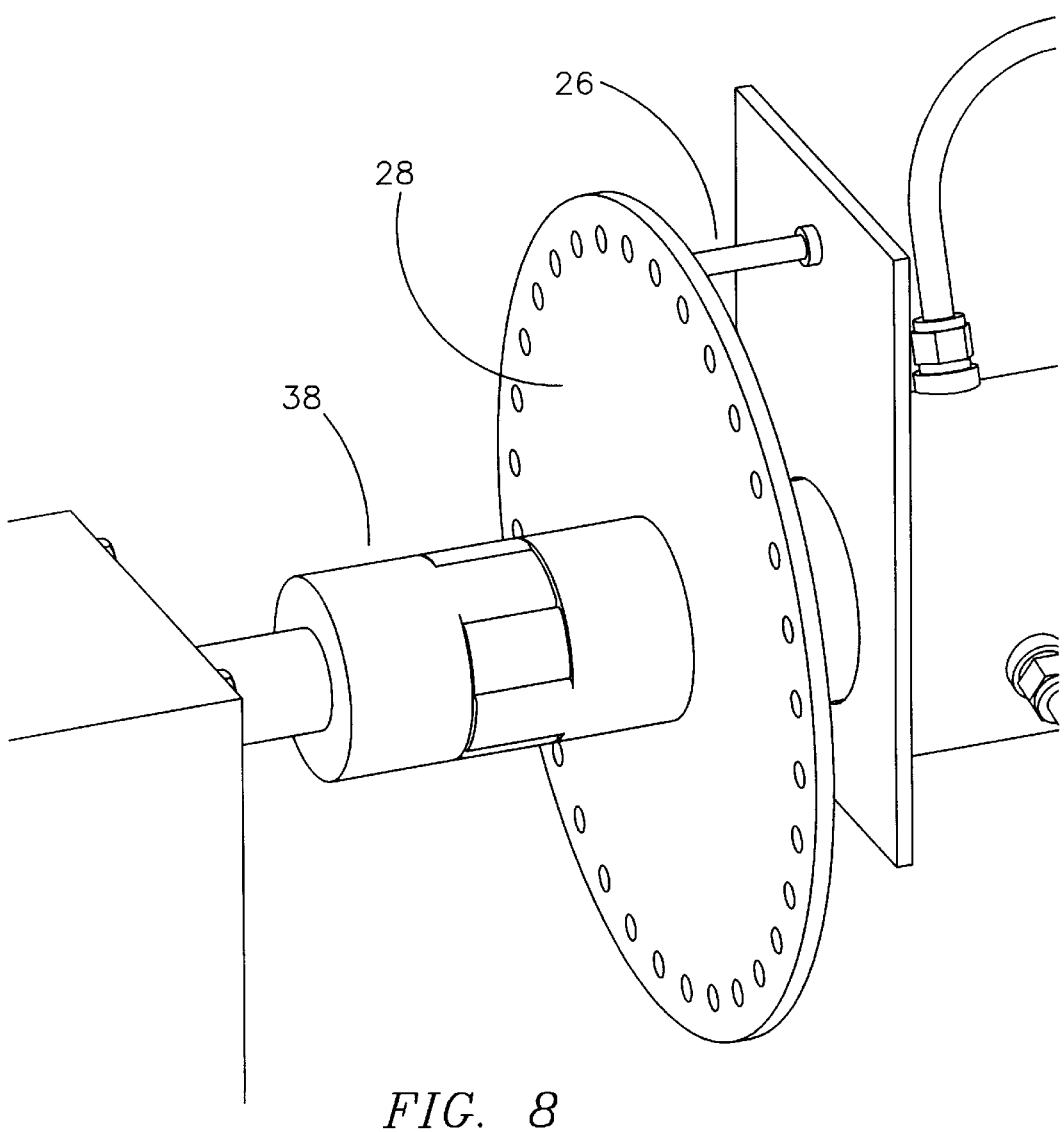
FIG. 8 shows the rotary encoder apparatus consisting of a proximity sensor and disk.

FIG. 8 shows a closeup of the shaft coupling 38, the metal disk 28 with 24 holes for the proximity sensor 26 to sense and report to the controller 20 (FIG. 2).

Operation FIGS. 1 to 8

This embodiment of the invention shows a cup weight test setup. The pump 10 (FIG. 1) and motor 12 (FIG. 1) are coupled and mounted on the lowest level of the cart (FIG. 1). The feed tank or hopper 18 (FIG. 1) is located above the pump 10 (FIG. 1) and motor 12 (FIG. 1) and is piped into the pump suction. Mounting the hopper 18 above the pump suction ensures a steady supply of product to the pump. The pump discharge is piped to the valved manifold 14 (FIG. 1).

Another embodiment of the depositor would have the manifold 14 (FIG. 1) suspended above a conveyor for muffin or cake pans. The pans pass underneath the manifold 14 (FIG. 1) and the controller 10 (FIG. 1) senses the edge of the pan and calculates the precise time delay before the first deposit from the conveyor speed sensor and distance to the first row of cups from the pan edge. The depositor controller 10 (FIG. 1) waits the calculated time until the first row is under the manifold nozzles and deposits the exact amount of batter or filling into each baking pan cup in the front row. Based upon the number of pan rows and the distance between them, the stepping motor 12 (FIG. 1) rotates the pump shaft in precise turns or fractions thereof to exactly fill each cup in each pan row. Since the number of rows has been downloaded to the depositor controller 20 (FIG. 1) for the type of pan, the high speed depositor stops automatically after the last row of the pan and waits to sense the edge of the next pan. This avoids the wasting of any of the product.

In another embodiment of this invention, the high speed depositor utilizes a food grade positive displacement pump 10 (FIG. 1) driven by a high-torque stepping motor 12 (FIG. 1) controlled by an industrial control computer or controller 20 (FIG. 1). The pump suction is connected to a tank or trough of batter or filling and the pump forces the batter or filling out of a specially designed manifold into a commercial baking pan, e.g., a 54 muffin (6 columns×9 rows) pan, in precise amounts. The manifold nozzles, one for each row of cups, are engineered to deposit the same amount of batter or filling into each pan or cup as it passes under the depositor on a food-grade conveyor. This is done by some means of controlling flow individually through each nozzle, e.g., via restriction orifice plates or control valves.

In the same embodiment discussed in the last paragraph, the controller 20 (FIG. 1) causes the stepping motor 12 (FIG. 1) driving the positive displacement pump 10 (FIG. 1) to turn the exact amount necessary to push the desired amount of batter or filling through the manifold and into the cups. If the stepping motor is air driven the degree of turning is controlled by how long the air solenoid valve is held open by the computer. The computer counts the number of pulses emitted by either a proximity or photo switch sensing light and dark divisions on a disk which rotates with the pump and/or motor shaft or receives an input from a self-contained encoder also connected to the pump shaft, in order to measure the amount of turning which is directly proportional to the amount of batter or filling deposited. For example, if there were 6 cups per row on the baking pan then a manifold with 6 nozzles would be used for delivering the deposits. Dividing the amount of batter or filling pushed out in precise, full and/or partial revolution by 6 would give the individual cup weight. After baking this cup weight would result in the desired individual product weight as displayed on the packaging.

It may be necessary to have different manifold designs for different viscosity ranges and product flows.

Through a careful design of the manifold and the controls for the stepping motor and the positive displacement pump, the high speed depositor will be capable of typically 2 or more deposits per second (120 per minute) into a pan on a conveyor running under the manifold nozzles. The computer-based controls for the stepping motor and pump will also control the start of the depositing in the first row of cups by sensing the leading edge of the pan. The high speed depositor should, at a minimum, double the output of the depositing or filling line.

CONCLUSIONS, RAMIFICATIONS, AND SCOPE

The high speed depositor significantly reduces or eliminates the batter or filling line as the bakery production bottleneck.

The high speed depositor allows the bakery operations personnel to quickly setup for the next product pan size and cup weight by simply changing out the depositor manifold and downloading the next product configuration to the depositor controller. This flexibility allows the bakery to produce multiple short runs of different products to support marketing trials of new products.

Equipment maintenance costs are reduced because there are fewer moving parts to breakdown and require repair or replacement.

Spare parts inventory is reduced because there are fewer different types of depositors required to meet the varying needs of a large bakery.

Faster production of the same products previously manufactured with piston depositors and other types of fixed chamber forming of individual deposits is now possible resulting in greater profits to the bakery.

I claim:

1. A high speed depositor, comprising:
   (A) a controller circuit;
   (B) a stepping motor, in communication with a power source of compressed air and driving a motor shaft;
   (C) a solenoid valve, in communication with the controller circuit, controlling the power source of compressed air supplied to the stepping motor;
   (D) an encoder disk, carried by the motor shaft, defining a plurality of holes arrayed in a perimeter portion of the encoder disk;
   (E) an encoder proximity sensor, adjacent to the perimeter portion of the encoder disk and in communication with the controller circuit;
   (F) a positive displacement pump driven by the motor shaft, having an input in communication with a product hopper;
   (G) a depositing manifold, in communication with an output of the positive displacement pump;
   (H) a plurality of individual depositing nozzles, in communication with the depositing manifold;
   (I) download means, in communication with the controller, for transmitting a product configuration containing information including the volume of product to deposit to result in correct cup weight, the conveyor speed, pan configuration including cup size, distances between cup rows and the number of cup rows; and
   (J) controller program means, executed on the controller, for using the product configuration to calculate when to start and stop the high torque stepping motor by opening and closing the solenoid valve.

2. The high speed depositor of claim 1, additionally comprising:
   (A) an orifice plate, attached to the manifold, defining a plurality of openings, each of the plurality of openings in communication with one of the plurality of individual nozzle and each of the plurality of openings sized to result in passage of an equal flow rate.

3. The high speed depositor of claim 1, additionally comprising:
   (A) a plurality of individual nozzle valves, each individual nozzle valve in communication with the manifold and each individual nozzle defining a variably sized orifice.

4. The high speed depositor of claim 3, additionally comprising:
   (A) a plurality of volume flow measurement devices in communication with the controller circuit; and (B) communications means, between the controller circuit and each of the plurality of individual nozzle valves, for adjusting each of the plurality of individual nozzle valves to result in an equal flow rate through each of the plurality of individual nozzle valves.

5. The high speed depositor of claim 3, additionally comprising:

(A) a plurality of mass flow measurement devices in communication with the controller circuit; and (B) communications means, between the controller circuit and each of the plurality of individual nozzle valves, for adjusting each of the plurality of individual nozzle valves to result in an equal flow rate through each of the plurality of individual nozzle valves.

6. A high speed depositor, comprising:

(A) a controller circuit;

(B) a stepping motor, in communication with a power source of compressed air and driving a motor shaft;

(C) a solenoid valve, in communication with the controller circuit, controlling the power source of compressed air supplied to the stepping motor;

(D) an encoder disk, carried by the motor shaft, defining a plurality of holes arrayed in a perimeter portion of the encoder disk;

(E) an encoder proximity sensor, adjacent to the perimeter portion of the encoder disk and in communication with the controller circuit;

(F) a positive displacement pump driven by the motor shaft, having an input in communication with a product hopper;

(G) a depositing manifold, in communication with an output of the positive displacement pump;

(H) a plurality of individual nozzle valves, each individual nozzle valve in communication with the manifold and each individual nozzle valve defining a variably sized orifice;

(I) a mass flow measurement device in communication with the controller circuit; and (J) communications means, between the controller circuit and each of the plurality of individual nozzle valves, for adjusting each of the plurality of individual nozzle valves to result in an equal flow rate through each of the plurality of individual nozzle valves;

(K) download means, in communication with the controller, for transmitting a product configuration containing information including the volume of product to deposit to result in correct cup weight, the conveyor speed, pan configuration including cup size, distances between cup rows and the number of cup rows; and (L) controller program means, executed on the controller, for using the product configuration to calculate when to start and stop the high torque stepping motor by opening and closing the solenoid valve.

* * * * *